(12) United States Patent
Araujo

(10) Patent No.: US 11,979,463 B2
(45) Date of Patent: May 7, 2024

(54) SECURE WIRELESS UPDATE DURING VEHICLE TRANSPORT

(71) Applicant: GM Cruise Holdings LLC, San Francisco, CA (US)

(72) Inventor: Wilbur O Araujo, Incline Village, NV (US)

(73) Assignee: GM Cruise Holdings LLC, San Francisco, CA (US)

( * ) Notice: Subject to any disclaimer, the term of this patent is extended or adjusted under 35 U.S.C. 154(b) by 3 days.

(21) Appl. No.: 17/855,748

(22) Filed: Jun. 30, 2022

(65) Prior Publication Data

US 2024/0007529 A1    Jan. 4, 2024

(51) Int. Cl.
| | | |
|---|---|---|
| G06F 8/658 | (2018.01) | |
| B60W 50/06 | (2006.01) | |
| G01C 21/00 | (2006.01) | |
| G06Q 10/20 | (2023.01) | |
| G06Q 50/40 | (2024.01) | |
| H04L 67/12 | (2022.01) | |
| H04L 67/141 | (2022.01) | |
| H04L 67/568 | (2022.01) | |
| B60L 58/12 | (2019.01) | |

(52) U.S. Cl.
CPC ............. *H04L 67/12* (2013.01); *B60W 50/06* (2013.01); *G01C 21/3896* (2020.08); *G06Q 10/20* (2013.01); *G06Q 50/40* (2024.01); *H04L 67/141* (2013.01); *H04L 67/568* (2022.05); *B60L 58/12* (2019.02)

(58) Field of Classification Search
CPC ..... H04L 67/12; H04L 67/141; H04L 67/568; B60W 50/06; G01C 21/3896; G06Q 10/20; G06Q 50/30; B60L 58/12
See application file for complete search history.

(56) References Cited

U.S. PATENT DOCUMENTS

| | | | | |
|---|---|---|---|---|
| 10,140,781 | B2* | 11/2018 | Blakemore | ............ G07C 5/008 |
| 2005/0039208 | A1* | 2/2005 | Veeck | ....................... H04N 7/18 |
| | | | | 725/74 |
| 2008/0043687 | A1* | 2/2008 | Lee | ..................... H04W 84/005 |
| | | | | 370/310.2 |
| 2008/0159281 | A1* | 7/2008 | Jesseph | ............... H04L 12/4013 |
| | | | | 370/389 |
| 2010/0085947 | A1* | 4/2010 | Ringland | .......... H04W 28/0226 |
| | | | | 370/338 |
| 2010/0268401 | A1* | 10/2010 | Blakemore | ............ G06Q 10/06 |
| | | | | 701/1 |
| 2010/0299207 | A1* | 11/2010 | Harlev | ............... G06Q 30/0265 |
| | | | | 705/14.62 |
| 2013/0158777 | A1* | 6/2013 | Brauer | .................... G06Q 10/20 |
| | | | | 701/31.4 |
| 2015/0296450 | A1* | 10/2015 | Koo | ....................... H04W 48/16 |
| | | | | 455/435.3 |

(Continued)

*Primary Examiner* — David P Zarka
*Assistant Examiner* — Wuji Chen
(74) *Attorney, Agent, or Firm* — Michael DiCato

(57) ABSTRACT

Systems and method for updating vehicles during transport. In particular, systems and methods are provided for transport vehicles to provide secure wireless updates to autonomous vehicles being transported. By updating vehicles during transport, significant time savings can be achieved, as vehicles can arrive at a destination ready for deployment. A secure protocol can be used by the transport vehicle for the updates to protect software and other data.

20 Claims, 6 Drawing Sheets

(56) References Cited

U.S. PATENT DOCUMENTS

| | | | |
|---|---|---|---|
| 2016/0075242 A1* | 3/2016 | Kim | B60L 53/62 |
| | | | 320/109 |
| 2017/0302362 A1* | 10/2017 | High | H04W 24/02 |
| 2017/0339124 A1* | 11/2017 | Karlsson | H04L 63/101 |
| 2017/0347236 A1* | 11/2017 | Frusina | G06F 9/44505 |
| 2018/0020393 A1* | 1/2018 | Karlsson | H04W 4/90 |
| 2018/0375939 A1* | 12/2018 | Magalhães de Matos | |
| | | | H04L 41/12 |
| 2019/0082381 A1* | 3/2019 | Thanayankizil | H04W 4/40 |
| 2019/0108010 A1* | 4/2019 | Tillman | H04L 67/12 |
| 2019/0212997 A1* | 7/2019 | Sangameswaran | H04L 67/52 |
| 2019/0217736 A1* | 7/2019 | Donnelly | G05D 1/0088 |
| 2019/0221054 A1* | 7/2019 | Kumar | G07C 5/085 |
| 2020/0125355 A1* | 4/2020 | Aust | G06F 8/65 |
| 2020/0382981 A1* | 12/2020 | Kachemir | H04W 48/16 |
| 2021/0173635 A1* | 6/2021 | Shin | G01R 31/3647 |
| 2021/0239492 A1* | 8/2021 | Yano | G06Q 10/20 |
| 2022/0122011 A1* | 4/2022 | Islam | G05B 13/0265 |
| 2022/0201584 A1* | 6/2022 | Piriou | H04W 36/08 |
| 2022/0258640 A1* | 8/2022 | Ando | B60L 53/305 |
| 2022/0294277 A1* | 9/2022 | Wolgemuth | B60L 53/38 |
| 2022/0305942 A1* | 9/2022 | Mannepalli | H02J 7/00032 |
| 2023/0054982 A1* | 2/2023 | Corda | G07C 5/008 |
| 2023/0093158 A1* | 3/2023 | Ivanov | G01S 5/02526 |
| | | | 342/457 |
| 2023/0107709 A1* | 4/2023 | Zahdeh | B25J 5/007 |
| | | | 701/50 |
| 2023/0126393 A1* | 4/2023 | Michel | H04W 16/225 |
| | | | 370/316 |
| 2023/0401958 A1* | 12/2023 | Palamadai | H04W 88/08 |

* cited by examiner

100

SECURE WIRELESS UPDATE DURING VEHICLE TRANSPORT

BACKGROUND

1. Technical Field

The present disclosure generally relates to vehicle transport and, more specifically, to vehicle updates during transport.

2. Introduction

An autonomous vehicle (AV) is a motorized vehicle that can navigate without a human driver. An exemplary autonomous vehicle can include various sensors, such as a camera sensor, a light detection and ranging (LIDAR) sensor, and a radio detection and ranging (RADAR) sensor, among others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

Before an autonomous vehicle begins driving autonomously, various data is loaded to the vehicle computer, various vehicle components are calibrated, and inspections are performed, among other things. Performing the pre-driving updates and checks can be time consuming and significantly delays the time until a vehicle is ready for operation.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Systems and method are provided for updating vehicles during transport. In particular, systems and methods are provided for transport vehicles to provide secure wireless updates to autonomous vehicles being transported. By updating vehicles during transport, significant time savings can be achieved, as vehicles can arrive at a destination ready for deployment. A transport vehicle access point can download vehicle updates and other vehicle data, and provide the updates and data to the vehicles being transported. In some implementations, vehicle data is provided to a transport vehicle before a transport trip is undertaken, while in some examples, a transport vehicle downloads vehicle data and updates during the trip. A secure protocol can be used by the transport vehicle for the updates to protect vehicle software and other data.

After vehicle production, vehicles are often transported many miles to different cities and different parts of the country (and sometimes to other countries). Generally, vehicles are loaded onto transport trucks to bring the vehicles to their final destination. Once vehicles reach their final destination, there are services and updates to the vehicle before it is deployed. These services and updates can take hours, time during which the vehicle is not able to transport people or goods and generate revenue.

Thus, systems and methods are provided herein for perform vehicle services and/or updates during transport. When various services and/or updates are completed during transport, the vehicle can arrive at its destination ready for deployment with minimal delay. This decreases down-time of the vehicle, increasing fleet efficiency and revenue.

Example Autonomous Vehicle for Secure Wireless Updates

Figure 1:
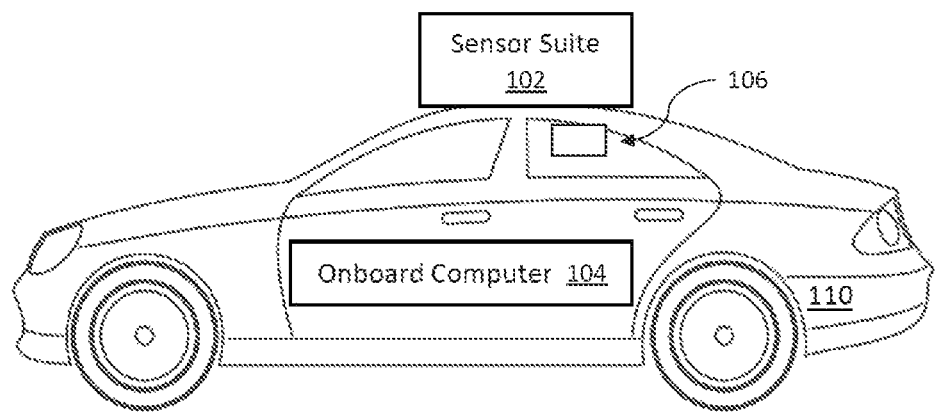
FIG. 1 illustrates an autonomous vehicle, according to some examples of the present disclosure.

FIG. 1 is a diagram of an autonomous driving system 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. In some examples, the autonomous vehicle 110 includes a vehicle update component 106 that connect with an access point to download vehicle updates, maps, and other vehicle data.

The sensor suite 102 includes localization and driving sensors. For example, the sensor suite may include one or more of photodetectors, cameras, radio detection and ranging (RADAR), sound navigation and ranging (SONAR), light detection and ranging (LIDAR), Global Positioning System (GPS), inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. In particular, the sensor suite 102 can be used to identify information and determine various factors regarding an autonomous vehicle's environment. In some examples, data from the sensor suite 102 can be used to update a map with information used to develop layers with waypoints identifying various detected items. In some examples, data from the sensor suite 102 can include information regarding crowds and/or lines outside and/or around selected venues. The data and map waypoints can be used by the recovery prioritization system in determining a risk profile of a stranded vehicle. Additionally, sensor suite 102 data can provide localized traffic information. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some examples, the onboard computer 104 checks for vehicle updates from a central computer or other secure access point. In some examples, a vehicle sensor log receives and stores processed sensed sensor suite 102 data from the onboard computer 104. In some examples, a vehicle sensor log receives sensor suite 102 data from the sensor suite 102. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Additionally, based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some examples, the onboard computer 104 can determine that a vehicle is being transported in a transport truck. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to an access point on a transport truck via a wireless connection. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Method for Secure Updates During Transport

Figure 2:
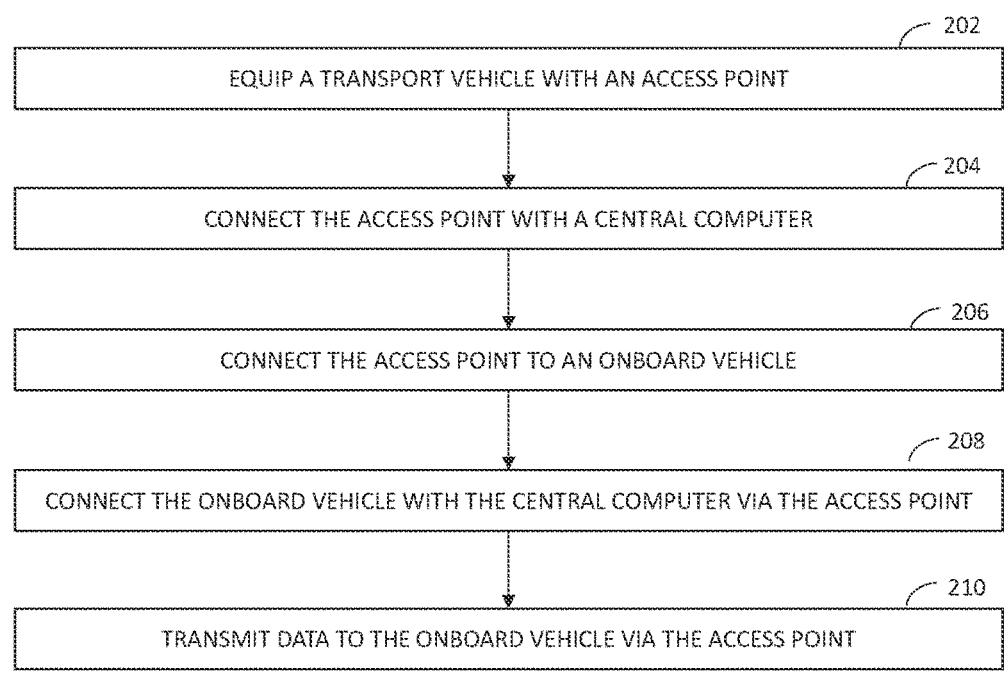
FIG. 2 illustrates an example of a method for updating vehicles during transport, according to some examples of the present disclosure.

FIG. 2 illustrates an example of a method for updating vehicles during transport, according to various examples of the present disclosure. At step 202, the transport vehicle is equipped with an access point. The transport vehicle can be a truck, tractor trailer, flatbed truck, tow truck, train, ship, or any other vehicle that can carry one or more onboard vehicles. The access point on the transport vehicle can be a hub that can connect with a central computer and/or cloud computer. In some examples, the access point is a hotspot to which onboard vehicles can connect. In various examples, the access point includes one or more antennas and a transceiver. The access point can also include an access point computer having one or more of the computer components described below with respect to FIG. 6.

At step 204, the access point is connected with a central computer. In various examples, the access point can connect with a central computer via a wireless connection and/or via a wired connection. The access point can communicate with the central computer, transmit and/or upload data to the central computer, and receive and/or download from the central computer. In some examples, the access point can connect with the central computer via a cellular network, such as an Long-Term Evolution (LTE) network, a 5G network, a 4G network, a 3G network, a Global System for Mobile Communications (GSM) network, a global area network (GAN), and/or a satellite network. In some examples, the access point can connect to a central computer via a wired connection, such as when the transport vehicle is at a facility to pick up and or drop off vehicles for transport. The wired connection can be, for example, an Ethernet cable or optical fiber cable connection. In various examples, the access point can download vehicle updates for onboard vehicles, map data for onboard vehicles, software for onboard vehicles, and other onboard vehicle data.

At step 206, the access point is connected to one or more onboard vehicles. The access point can provide a wireless connection to onboard vehicles on the transport vehicle. In particular, each onboard vehicle can connect with the access point. In some examples, the onboard vehicles communicate with the access point, receive and/or download data from the access point, and transmit and/or upload data to the access point. In various examples, the onboard vehicles download updates from the access point. In some examples, the onboard vehicles transmit data to the access point, such as battery charge data, self-inspection data, and current software version data. In some implementations, the access point can provide a wired connection to onboard vehicles on the transport vehicle.

At step 208, the onboard vehicles are connected with a central computer via the access point. In some examples, via the access point, onboard vehicles can communicate with the central computer, receive and/or download data from the central computer, and transmit and/or upload data to the central computer.

At step 210, data is transmitted to the onboard vehicles via the access point. In some examples, one or more of the onboard vehicles are to receive the same data. The data is transmitted to the access point from the central computer and stored at the access point. Each vehicle can access the data from the access point. Thus, the central computer can transmit data for multiple vehicles to one access point, rather than transmitting data directly to multiple vehicles. Once the access point has received the data, the onboard vehicles can download and install the data while in transit on the transport vehicle. In some examples, the data includes vehicle component updates such as software and/or firmware updates. In some examples, the data includes map data. In various examples, the onboard vehicles may need a to download and install a large amount of data (e.g., map data can be many gigabytes), which can take multiple hours. Thus, providing the access point for the onboard vehicles to download data while in transit on a transport vehicle prevents the need to download the data at a facility at arrival (or before departure). This results in time savings efficiencies as the onboard vehicles can be ready for deployment at arrival.

In various examples, security protocols are provided for connections between the access point and the central computer and for connections between the access point and the onboard vehicles. In some examples, the access point can connect to the central computer using encryption methods, WIFI® protected access protocols, or other security systems and methods. In some examples, the onboard vehicles connect to the access point using encryption methods, WIFI® protected access protocols, or other security systems and methods.

Example Transport Vehicle for Secure Updates
During Transport

Figure 3:
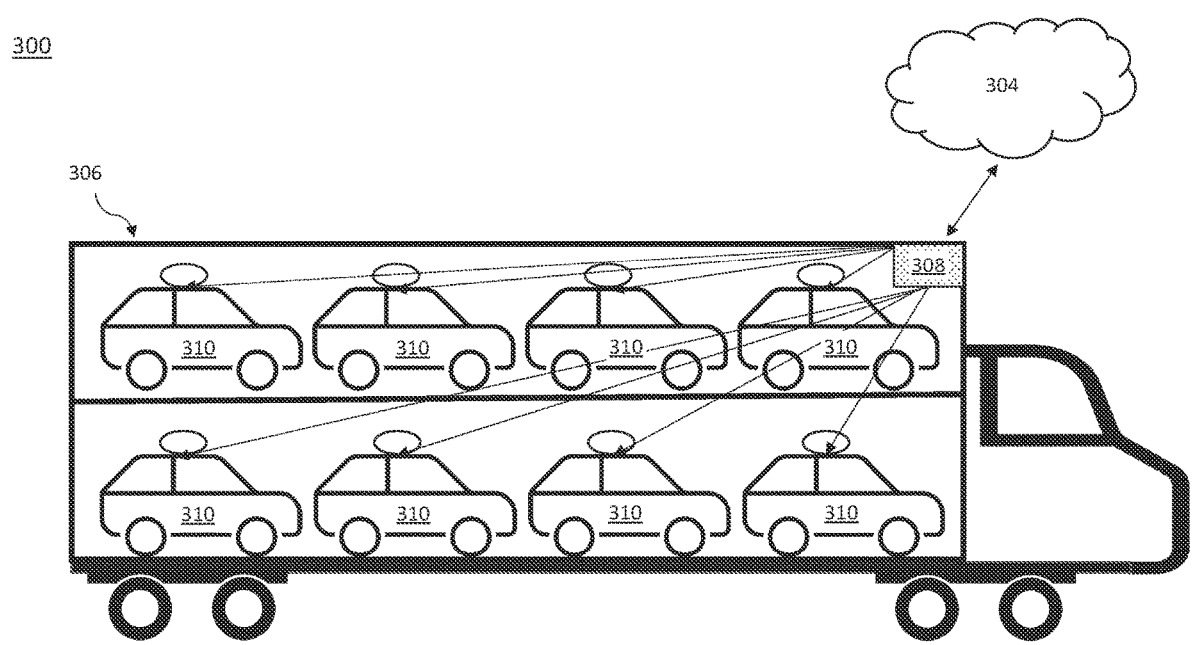
FIG. 3 illustrates an example of a transport vehicle for updating onboard vehicles during transport, according to some examples of the present disclosure.

FIG. 3 illustrates an example of a transport vehicle for updating onboard vehicles 310 during transport, according to various examples of the present disclosure. The transport vehicle is a truck 306, which is loaded with the vehicles 310. The truck 306 includes an access point 308. The access point 308 is wirelessly connected to a central computer, for example via a cloud 304. Each of the vehicles 310 can connect to the access point 308. In various examples, the vehicles 310 each include an onboard computer that downloads data from the access point 308, such as map data and vehicle updates. In various examples, the vehicles 310 transmit data to the access point 308.

In various examples, each of the vehicles 310 includes a transceiver that can connect with a central computer to download and/or upload data. However, the access point 308 provides an efficient means for downloading data for all the vehicle 310 a single time, rather than each vehicle 310 downloading the data individually. Additionally, the access point 308 can be pre-loaded with the data before the onboard vehicles 310 are loaded onto the truck 306. In some examples, the access point 308 provides data to a first set of vehicles during a first trip and provides the same data to a second set of vehicles during a second trip. Additionally, in some examples, the data at the access point 308 is periodically updated overtime, rather than being replaced by new data. For instance, the access point 308 can provide map data to the onboard vehicles 310, and the access point 308 can provide the same map data to another set of vehicles during a subsequent trip. When the map data changes, the map data can be updated with minor changes rather than being reloaded from scratch. The updated map data can then be provided to another set of vehicles. Accordingly, rather than downloading a large data set from the central computer many times (i.e., once for each vehicle being transported), the large data set can be downloaded from the central computer once and then provided to many vehicles being transported via the access point 308. Thus, there are many potential efficiencies in using the access point 308 to provide data to the onboard vehicles.

In some examples, the access point 308 can have data manually replaced at a facility. For example, a first hard drive with a first data set can be loaded on to the truck 306 at a first facility, and at arrival at a second facility, the first hard drive can be replaced with a second hard drive with a second data set. In other examples, the access point 308 can access a high-speed connection at a loading facility and download data for the onboard vehicles 310 while the truck 306 is being serviced and the vehicles 310 are being loaded.

The data available at the access point 308 for the onboard vehicles 310 can include map data, fleet standards data, firmware updates, software updates, and vehicle control unit (VCU) updates (e.g., RADAR updates). In some examples, onboard vehicles 310 can provide data to the access point 308, such as self-calibration data, battery charge data, and tire pressure data.

In some examples, the truck 306 is equipped to charge the onboard vehicles 310. For example, the truck 306 can include battery packs that can be used to charge the onboard vehicles 310. In some examples, the truck 306 can charge the onboard vehicles 310 wirelessly, and in some examples, the truck 306 can charge the onboard vehicles 310 via a wired connection. In some examples, if the onboard vehicles 310 are charged via a wired connection, the wired connection to the onboard vehicles 310 includes a wired connection to the access point 308, such as an Ethernet cable or optical fiber cable connection. In various examples, onboard vehicles 310 are shipped with a charge within a selected state of charge range, and additional power may be needed for updates.

In some examples, the truck 306 includes sensors such as cameras and LIDARs that can inspect various features of the onboard vehicles 310. For instance, LIDAR can be used to determine if vehicle metrology is accurate with a selected degree. The truck 306 can also include inspection hardware such as computer hardware, scan tools, and temperature sensors. The sensors in the truck 306 can also be used to detect any damage to the exterior of any of the onboard vehicles 310, such as a dent or scratch. Similarly, interior sensors in the onboard vehicles 310 can detect any issues with the vehicle cabin and/or trunk, such as a dirty seat that needs cleaning. The onboard vehicle 310 can report any detected issues with the access point 308.

In some examples, onboard vehicles 310 can perform a self-inspection and can provide information regarding a detected fault to the access point 308. For instance, onboard vehicle 310 perception stacks (described below with respect to FIG. 5) can be used to self-inspect vehicles and identify faults. In some examples, the access point 308 can read data produced by the onboard vehicles 310 and detect a fault on one of the onboard vehicles 310. The access point 308 can communicate the detected fault to the central computer. In some examples, the central computer includes a database of information about each of the onboard vehicles 310. The central computer updates its database when it receives information about any of the onboard vehicles 310 from the access point 308. When the central computer receives notification of a detected fault, the central computer can provide the data to the destination facility. When the onboard vehicle with the detected fault arrives at the destination facility, the facility can be prepared to repair the fault. For instance, the destination facility may have preordered any necessary parts, scheduled the vehicle for a repair bay having the features necessary to fix the vehicle (e.g., a heavy duty lifting bay), and scheduled a repair technician having the expertise to fix the vehicle.

In some implementations, each onboard vehicle 310 provides an indication of data download and/or data install status to the access point 308. The access point 308 may include one or more databases to store update data for each onboard vehicle 310. The access point 308 can provide the database information to a central computer. The central computer may maintain one or more databases with data related to vehicle updates for each onboard vehicle 310, including a date of the last full update and version information for the update.

In some implementations, the access point 308 determines power requirements for various updates and/or data installs, and a state of charge of the battery in each onboard vehicle 310. The access point 308 can thereby determine whether each onboard vehicle 310 has sufficient charge for updates and/or data installs that are scheduled for the onboard vehicle 310. In some examples, when an onboard vehicle 310 does not have sufficient charge for all the updates and/or data installs for which it is scheduled, the access point 308 determines which updates and/or data installs the onboard vehicle 310 has sufficient charge for and transmits the data for the selected updates and/or installs. In some examples, updates and/or data installs for the onboard vehicles 310 are ranked by a central computer, such that the higher-ranked updates and/or installs are prioritized.

In some examples, the truck 306 is designed for performing onboard vehicle 310 updates while in transit. In some examples, the truck 306 is an open bed truck such that the onboard vehicles 310 can communicate with the cloud 304 and a central computer. In some examples, the truck 306 has an enclosed truck bed but includes one or more outer portions that are enclosed with plastic or another material that allows the onboard vehicles 310 to communicate with the cloud 304 and a central computer. In some examples, the truck 306 has a mostly-enclosed truck bed that includes multiple holes in various areas that allow the onboard vehicles 310 to communicate with the cloud 304 and a central computer. In some examples, the truck 306 includes one or more battery packs for charging onboard vehicles 310. In some examples, the truck 306 includes means for recharging onboard battery packs, such as a solar panel charger.

Example System for Secure Updates During Transport

Figure 4:
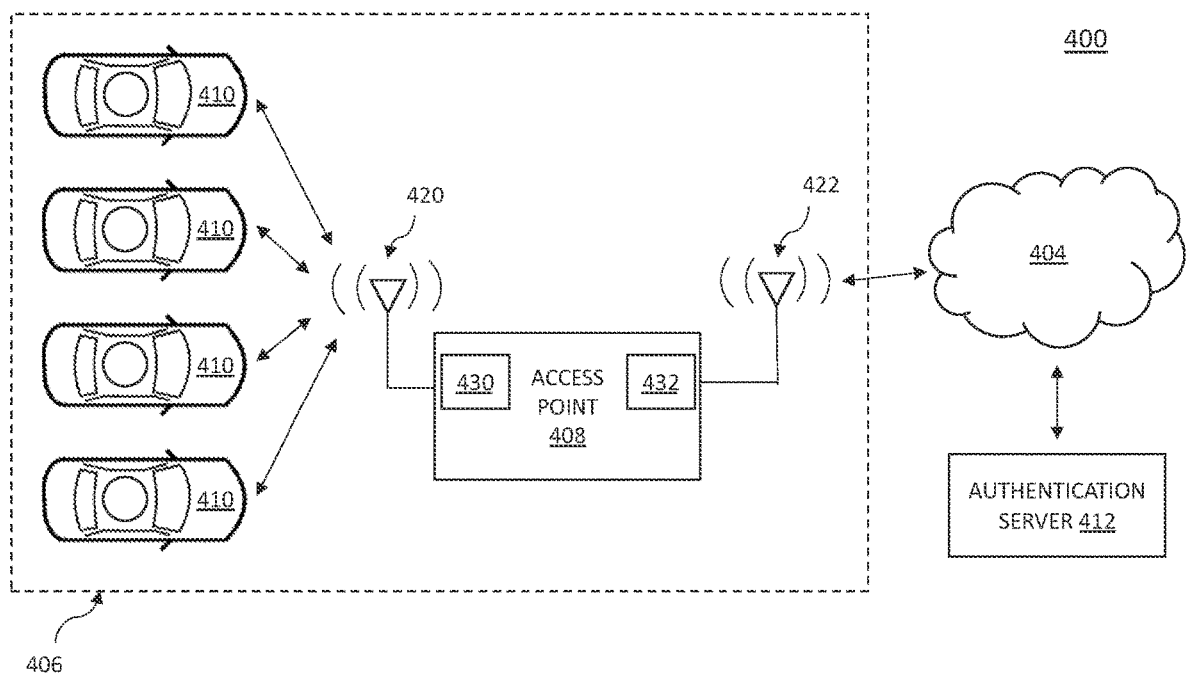
FIG. 4 illustrates an example of a system for updating onboard vehicles during transport, according to various examples of the present disclosure.

FIG. 4 illustrates an example of a system 400 for updating onboard vehicles during transport, according to various examples of the present disclosure. The system 400 includes an access point 408 having first 420 and second 422 antennas. The access point 408 is on a transport vehicle 406, which can also be transporting multiple onboard vehicles 410. The onboard vehicles 410 can connect with the access point 408 wirelessly via the first antenna 420. The first antenna 420 is coupled to a first transceiver 430, and the first transceiver 430 can transmit and receive signals via the first antenna 420. In various examples, the onboard vehicles 410 autonomously connect with the access point 408. In some examples, to connect to the access point 408, the onboard vehicles 410 transmit login credentials or other authentication information to the access point 408 via the first antenna 420.

The access point 408 connects to a central computer 404 via a second antenna 422. The second antenna 422 is coupled to a second transceiver 432, and the second transceiver 432 can transmit and receive signals via the second antenna 422. In various examples, the access point 408 autonomously connects with a cloud 404 and a central computer. In some examples, to connect to the central computer, the access point 408 transmits login credentials or other authentication information. In some examples, the cloud 404 and central computer are connected to an authentication server 412, and the authentication server 412 authenticates the access point 408, allowing the access point 408 to connect with the cloud 404 and the central computer. In some examples, the authentication server 412 issues a cryptographic ticket to the access point 408, which allows the access point 408 to communicate with the cloud 404 and the central computer for a selected period of time.

In various examples, the first 420 and second 422 antennas are antenna arrays or interfaces. In some examples, the first 420 and second 422 antennas are configured to transmit and receive different types of wireless signals. For example, the first antenna 420 may be configured to transmit and receive short range signals, such as WIFI® signals, BLUETOOTH® signals, Near-Field Communication (NFC) signals, and other signals that can transmit data within about fifty feet from the access point 408. The second antenna 422 may be configured to transmit and receive long range signals, for instance signals from cell towers and/or satellites. The second antenna 422 can provide a connection to a WIFI® network, a mobile or cellular network (e.g., Third Generation (3G), Fourth Generation (4G), LTE, 5th Generation (5G), etc.), and/or other wireless network connections (e.g., License Assisted Access (LAA), Citizens Broadband Radio Service (CBRS), MULTEFIRE, etc.).

Figure 5:
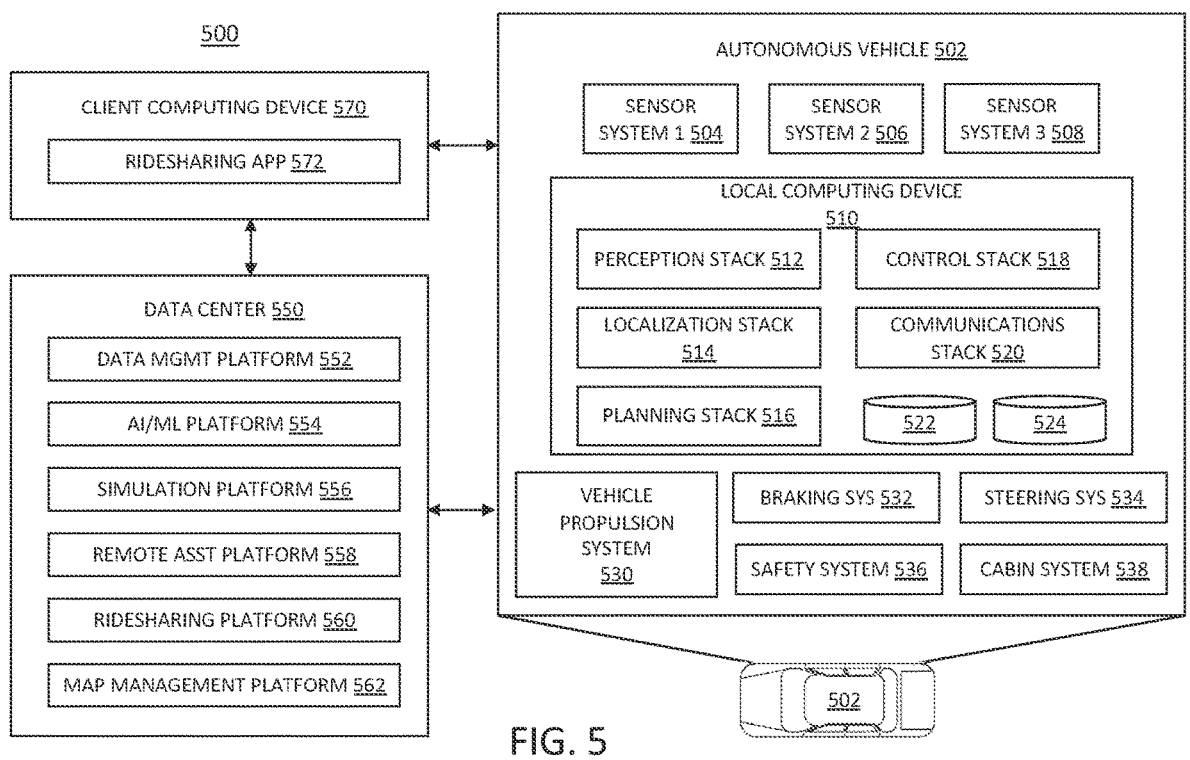
FIG. 5 illustrates an example system environment that can be used to facilitate autonomous vehicle (AV) dispatch and operations, according to some aspects of the disclosed technology.

Turning now to FIG. 5, this figure illustrates an example of an AV management system 500. One of ordinary skill in the art will understand that, for the AV management system 500 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 502 can navigate about roadways without a human driver based on sensor signals generated by multiple sensor systems 504, 506, and 508. The sensor systems 504-508 can include different types of sensors and can be arranged about the AV 502. For instance, the sensor systems 504-508 can comprise inertial measurement units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., GPS receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other embodiments may include any other number and type of sensors.

AV 502 can also include several mechanical systems that can be used to maneuver or operate AV 502. For instance, the mechanical systems can include vehicle propulsion system 530, braking system 532, steering system 534, safety system 536, and cabin system 538, among other systems. Vehicle propulsion system 530 can include an electric motor, an internal combustion engine, or both. The braking system 532 can include an engine brake, a wheel braking system (e.g., a disc braking system that utilizes brake pads), hydraulics, actuators, and/or any other suitable componentry configured to assist in decelerating AV 502. The steering system 534 can include suitable componentry configured to control the direction of movement of the AV 502 during navigation. Safety system 536 can include lights and signal indicators, a parking brake, airbags, and so forth. The cabin system 538 can include cabin temperature control systems, in-cabin entertainment systems, and so forth. In some embodiments, the AV 502 may not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

AV 502 can additionally include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a mapping and localization stack 514, a planning stack 516, a control stack 518, a communications stack 520, a High Definition (HD) geospatial database 522, and an AV operational database 524, among other stacks and systems.

Perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the mapping and localization stack 514, the HD geospatial database 522, other components of the AV, and other data sources (e.g., the data center 550, the client computing device 570, third-party data sources, etc.). The perception stack 512 can detect and classify objects and determine their current and predicted locations, speeds, directions, and the like. In addition, the perception stack 512 can determine the free space around the AV 502 (e.g., to maintain a safe distance from other objects, change lanes, park the AV, etc.). The perception stack 512 can also identify environmental uncertainties, such as where to look for moving objects, flag areas that may be obscured or blocked from view, and so forth.

Mapping and localization stack 514 can determine the AV's position and orientation (pose) using different methods from multiple systems (e.g., GPS, IMUs, cameras, LIDAR, RADAR, ultrasonic sensors, the HD geospatial database 522, etc.). For example, in some embodiments, the AV 502 can compare sensor data captured in real-time by the sensor systems 504-508 to data in the HD geospatial database 522 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

The planning stack 516 can determine how to maneuver or operate the AV 502 safely and efficiently in its environment. For example, the planning stack 516 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double- Parked Vehicles (DPVs), etc.), traffic rules and other safety standards or practices for the road, user input, and other relevant data for directing the AV 502 from one point to another. The planning stack 516 can determine multiple sets of one or more mechanical operations that the AV 502 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 516 can select from multiple backup plans to carry out. For example, while preparing to change lanes to turn right at an intersection, another vehicle may aggressively cut into the destination lane, making the lane change unsafe. The planning stack 516 could have already determined an alternative plan for such an event, and upon its occurrence, help to direct the AV 502 to go around the block instead of blocking a current lane while waiting for an opening to change lanes.

The control stack 518 can manage the operation of the vehicle propulsion system 530, the braking system 532, the steering system 534, the safety system 536, and the cabin system 538. The control stack 518 can receive sensor signals from the sensor systems 504-508 as well as communicate with other stacks or components of the local computing device 510 or a remote system (e.g., the data center 550) to effectuate operation of the AV 502. For example, the control stack 518 can implement the final path or actions from the multiple paths or actions provided by the planning stack 516. This can involve turning the routes and decisions from the planning stack 516 into commands for the actuators that control the AV's steering, throttle, brake, and drive unit.

The communication stack 520 can transmit and receive signals between the various stacks and other components of the AV 502 and between the AV 502, the data center 550, the client computing device 570, and other remote systems. The communication stack 520 can enable the local computing device 510 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 520 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), BLUETOOTH®, infrared, etc.).

The HD geospatial database 522 can store HD maps and related data of the streets upon which the AV 502 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 524 can store raw AV data generated by the sensor systems 504-508 and other components of the AV 502 and/or data received by the AV 502 from remote systems (e.g., the data center 550, the client computing device 570, etc.). In some embodiments, the raw AV data can include HD LIDAR point-cloud data, image or video data, RADAR data, GPS data, and other sensor data that the data center 550 can use for creating or updating AV geospatial data as discussed further below with respect to FIG. 5 and elsewhere in the present disclosure.

The data center 550 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 550 can include one or more computing devices remote to the local computing device 510 for managing a fleet of AVs and AV-related services. For example, in addition to managing the AV 502, the data center 550 may also support a ridesharing service, a delivery service, a remote/roadside assistance service, street services (e.g., street mapping, street patrol, street cleaning, street metering, parking reservation, etc.), and the like.

The data center 550 can send and receive various signals to and from the AV 502 and the client computing device 570. These signals can include sensor data captured by the sensor systems 504-508, roadside assistance requests, software updates, ridesharing pick-up and drop-off instructions, and so forth. In this example, the data center 550 includes one or more of a data management platform 552, an Artificial Intelligence/Machine Learning (AI/ML) platform 554, a simulation platform 556, a remote assistance platform 558, a ridesharing platform 560, and a map management platform 562, among other systems.

Data management platform 552 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridesharing platform 560, the map management platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

The simulation platform 556 can enable testing and validation of the algorithms, machine learning models, neural networks, and other development efforts for the AV 502, the remote assistance platform 558, the ridesharing platform 560, the map management platform 562, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from the map management platform 562; modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

The ridesharing platform 560 can interact with a customer of a ridesharing service via a ridesharing application 572 executing on the client computing device 570. The client computing device 570 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ridesharing application 572. The client computing device 570 can be a customer's mobile computing device or a computing device integrated with the AV 502 (e.g., the local computing device 510). The ridesharing platform 560 can receive requests to be picked up or dropped off from the ridesharing application 572 and dispatch the AV 502 for the trip.

Map management platform 562 can provide a set of tools for the manipulation and management of geographic and spatial (geospatial) and related attribute data. The data management platform 552 can receive LIDAR point-cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes when necessary. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some embodiments, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ridesharing platform 560 may incorporate the map viewing services into the client application 572 to enable passengers to view the AV 502 in transit en route to a pick-up or drop-off location, and so on.

Figure 6:
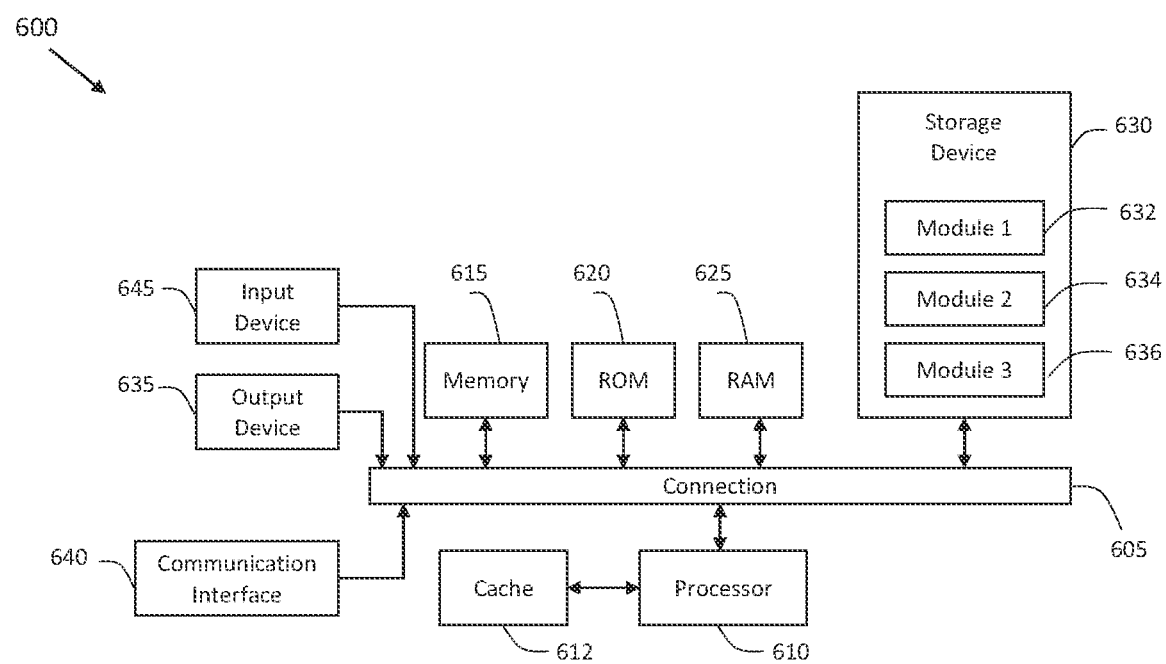
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 WIFI® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer-readable media which can store data that are accessible by a computer, such as magnetic cassettes, flash memory cards, solid-state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general-purpose or special-purpose computer, including the functional design of any special-purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network personal computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Selected Examples

Example 1 provides a method for vehicle updates during transport, comprising; connecting an access point with a central computer, wherein the access point is provided on a transport vehicle, and the access point is to provide data to a plurality of onboard vehicles; connecting the access point to each of the plurality of onboard vehicles; transmitting the data to each of the plurality of onboard vehicles from the access point; receiving, at the access point, vehicle information from each of the plurality of onboard vehicles; and transmitting the vehicle information from the access point to the central computer.

Example 2 provides a method, system, and/or vehicle according to one or more of the preceding and/or following examples, wherein connecting the access point with the central computer comprises wirelessly connecting the access point with the central computer and further comprising wirelessly receiving the data from the central computer.

Example 3 provides a method, system, and/or vehicle according to one or more of the preceding and/or following examples, further comprising connecting the access point with a hard drive and downloading the data from the hard drive to the access point.

Example 4 provides a method, system, and/or vehicle according to one or more of the preceding and/or following examples, wherein transmitting the data to each of the plurality of onboard vehicles includes at least one of transmitting maps, transmitting software updates, and transmitting firmware updates.

Example 5 provides a method, system, and/or vehicle according to one or more of the preceding and/or following examples, further comprising connecting the central computer with each of the plurality of onboard vehicles via the access point.

Example 6 provides a method, system, and/or vehicle according to one or more of the preceding and/or following examples, further comprising caching received vehicle information at the access point, and wherein transmitting the vehicle information includes periodically transmitting cached vehicle information from the access point to the central computer.

Example 7 provides a method, system, and/or vehicle according to one or more of the preceding and/or following examples, wherein receiving vehicle information further comprises receiving state of charge information from each of the plurality of onboard vehicles and further comprising determining a subset of the data for transmission to each of the plurality of onboard vehicles based on the state of charge.

Example 8 provides a method, system, and/or vehicle according to one or more of the preceding and/or following examples, further comprising providing battery charging to the plurality of onboard vehicles based on the state of charge information for each of the plurality of onboard vehicles.

Example 9 provides a method, system, and/or vehicle according to one or more of the preceding and/or following examples, further comprising inspecting each of the plurality of onboard vehicles using transport vehicle sensors, and transmitting an inspection report for each of the plurality of onboard vehicles from the access point to the central computer.

Example 10 provides a system for vehicle updates during transport, comprising: a plurality of onboard vehicles, each comprising: a vehicle memory to store vehicle data, and an onboard computer to determine a vehicle status; a central computer having a database including information on each of the plurality of vehicles; and a transport vehicle for transporting the plurality of onboard vehicles from a first location to a second location, the transport vehicle having an access point to: connect with the central computer, connect with each of the plurality of onboard vehicles, transmit updated vehicle data to each of the plurality of onboard vehicles, receive the vehicle status from each of the plurality of onboard vehicles; and transmit the vehicle status from the access point to the central computer.

Example 11 provides a method, system, and/or vehicle according to one or more of the preceding and/or following examples, wherein the updated vehicle data includes at least one of maps, software updates, and firmware updates, and wherein the onboard computer is to install the updated vehicle data during transport.

Example 12 provides a method, system, and/or vehicle according to one or more of the preceding and/or following examples, wherein the access point is to wirelessly connect with the central computer and to wirelessly receive the updated vehicle data from the central computer.

Example 13 provides a method, system, and/or vehicle according to one or more of the preceding and/or following examples, wherein the transport vehicle further includes a charger to provide battery charging to at least one of the plurality of onboard vehicles.

Example 14 provides a method, system, and/or vehicle according to one or more of the preceding and/or following examples, wherein the access point is to receive state of charge information from each of the plurality of onboard vehicles and the transport vehicle is to provide battery charging based on the state of charge information.

Example 15 provides a method, system, and/or vehicle according to one or more of the preceding and/or following examples, wherein the transport vehicle further includes a plurality of transport vehicle sensors to inspect each of the plurality of onboard vehicles, and wherein the access point is to transmit an inspection report for each of the plurality of onboard vehicles to the central computer.

Example 16 provides a method, system, and/or vehicle according to one or more of the preceding and/or following examples, wherein the access point includes an access point memory and wherein the access point is to store received vehicle information in the access point memory.

Example 17 provides a method, system, and/or vehicle according to one or more of the preceding and/or following examples, further comprising an authentication server in communication with the central computer to authenticate the access point and each of the plurality of onboard vehicles.

Example 18 provides a transport vehicle for providing onboard vehicle updates during transport from a first location to a second location, comprising: a plurality of vehicle spots, each for securing a respective one of a plurality of onboard vehicles; an access point to: connect with a central computer, connect with the plurality of onboard vehicles, transmit updated vehicle data to each of the plurality of onboard vehicles, receive vehicle information from each of the plurality of onboard vehicles; and transmit the vehicle information from the access point to the central computer.

Example 19 provides a method, system, and/or vehicle according to one or more of the preceding and/or following examples, wherein the access point is to wirelessly connect with the central computer and to wirelessly receive the updated vehicle data from the central computer.

Example 20 provides a method, system, and/or vehicle according to one or more of the preceding and/or following examples, wherein the access point includes an access point memory and wherein the access point is to store received vehicle information in the access point memory.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method for vehicle updates during transport, comprising:
    connecting an access point with a central computer, wherein the access point is provided on a transport vehicle, and the access point is to provide data to a plurality of onboard vehicles, wherein the data includes at least one of maps, software updates, and firmware updates;
    connecting the access point to each of the plurality of onboard vehicles;
    receiving, at the access point, vehicle information from each of the plurality of onboard vehicles, including receiving state of charge information from each of the plurality of onboard vehicles;
    determining, by the access point, a first subset of the data for transmission to each of the plurality of onboard vehicles based on the state of charge information;
    transmitting the first subset of the data to each of the plurality of onboard vehicles from the access point;
    transmitting the vehicle information from the access point to the central computer,
    instructing the transport vehicle to provide battery charging to a selected onboard vehicle,
    receiving updated state of charge information for the selected onboard vehicle,
    determining that an updated state of charge for the selected onboard vehicle is sufficient for installation of additional vehicle update data,
    identifying a second subset of the vehicle update data for transmission to the selected onboard vehicle, and
    transmitting the second subset of the vehicle update data to the selected onboard vehicle.

2. The method of claim 1, wherein connecting the access point with the central computer comprises wirelessly connecting the access point with the central computer and further comprising wirelessly receiving the data from the central computer.

3. The method of claim 1, further comprising connecting the access point with a hard drive and downloading the data from the hard drive to the access point.

4. The method of claim 1, further comprising connecting the central computer with each of the plurality of onboard vehicles via the access point.

5. The method of claim 1, further comprising caching received vehicle information at the access point, and wherein transmitting the vehicle information includes periodically transmitting cached vehicle information from the access point to the central computer.

6. The method of claim 1, further comprising providing battery charging to the plurality of onboard vehicles based on the state of charge information for each of the plurality of onboard vehicles.

7. The method of claim 1, further comprising inspecting each of the plurality of onboard vehicles using transport vehicle sensors, and transmitting an inspection report for each of the plurality of onboard vehicles from the access point to the central computer.

8. A system for vehicle updates during transport, comprising:
    a plurality of onboard vehicles, each comprising:
        a vehicle memory to store vehicle data, and
        an onboard computer to determine a vehicle status;
    a central computer having a database including information on each of the plurality of onboard vehicles and vehicle update data for each of the plurality of onboard vehicles; and
    a transport vehicle for transporting the plurality of onboard vehicles from a first location to a second location, the transport vehicle having an access point to:
        connect with the central computer,
        receive the vehicle update data from the central computer, wherein the vehicle update data includes at least one of maps, software updates, and firmware updates,
        connect with each of the plurality of onboard vehicles,
        receive the vehicle status from each of the plurality of onboard vehicles, including a state of charge information for each of the plurality of onboard vehicles,
        identify a first subset of the vehicle update data for transmission to each of the plurality of onboard vehicles based on the state of charge information,
        transmit the first subset of the vehicle update data to each of the plurality of onboard vehicles from the access point,
        transmit the vehicle status from the access point to the central computer,
        instruct the transport vehicle to provide battery charging to a selected onboard vehicle,
        receive updated state of charge information for the selected onboard vehicle,
        determine that an updated state of charge for the selected onboard vehicle is sufficient for installation of additional vehicle update data,
        identify a second subset of the vehicle update data for transmission to the selected onboard vehicle, and
        transmit the second subset of the vehicle update data to the selected onboard vehicle.

9. The system of claim 8, wherein the onboard computer is to install the vehicle update data during transport.

10. The system of claim 8, wherein the access point is to wirelessly connect with the central computer and to wirelessly receive the vehicle update data from the central computer.

11. The system of claim 8, wherein the transport vehicle further includes a charger to provide battery charging to at least one of the plurality of onboard vehicles.

12. The system of claim 11, wherein the transport vehicle is to provide battery charging to respective onboard vehicles of the plurality of onboard vehicles based on the state of charge information.

13. The system of claim 8, wherein the transport vehicle further includes a plurality of transport vehicle sensors to inspect each of the plurality of onboard vehicles, and wherein the access point is to transmit an inspection report for each of the plurality of onboard vehicles to the central computer.

14. The system of claim 8, wherein the access point includes an access point memory and wherein the access point is to store received vehicle information in the access point memory.

15. The system of claim 8, further comprising an authentication server in communication with the central computer to authenticate the access point and each of the plurality of onboard vehicles.

16. A transport vehicle for providing onboard vehicle updates during transport from a first location to a second location, comprising:
- a plurality of vehicle spots, each for securing a respective one of a plurality of onboard vehicles;
- an access point to:
  - connect with a central computer,
  - receive vehicle update data from the central computer, wherein the vehicle update data includes at least one of maps, software updates, and firmware updates,
  - connect with the plurality of onboard vehicles,
  - receive vehicle information from each of the plurality of onboard vehicles, including a state of charge information from each of the plurality of onboard vehicles,
  - determine a first subset of the vehicle update data for transmission to each of the plurality of onboard vehicles based on the state of charge information,
  - transmit the first subset of the vehicle update data to each of the plurality of onboard vehicles from the access point,
  - transmit the vehicle information from the access point to the central computer
  - instruct the transport vehicle to provide battery charging to a selected onboard vehicle,
  - receive updated state of charge information for the selected onboard vehicle,
  - determine that an updated state of charge for the selected onboard vehicle is sufficient for installation of additional vehicle update data,
  - identify a second subset of the vehicle update data for transmission to the selected onboard vehicle, and
  - transmit the second subset of the vehicle update data to the selected onboard vehicle.

17. The transport vehicle of claim 16, wherein the access point is to wirelessly connect with the central computer and to wirelessly receive the vehicle update data from the central computer.

18. The transport vehicle of claim 16, wherein the access point includes an access point memory and wherein the access point is to store received vehicle information in the access point memory.

19. The system of claim 8, wherein the access point is further to determine, for the selected onboard vehicle of the plurality of onboard vehicles, that a respective state of charge for the selected onboard vehicle is less than sufficient charge for installation of the vehicle update data.

20. The method of claim 1, further comprising determining, for the selected onboard vehicle of the plurality of onboard vehicles, that a respective state of charge for the selected onboard vehicle is less than sufficient charge for installation of the vehicle update data.

* * * * *